United States Patent [19]

Witt

[11] 4,405,501

[45] Sep. 20, 1983

[54] AGING OF CHROMIUM-CONTAINING GEL AT HIGH PH

[75] Inventor: Donald R. Witt, Bartlesville, Okla.

[73] Assignee: Phillips Petroleum Company, Bartlesville, Okla.

[21] Appl. No.: 340,938

[22] Filed: Jan. 20, 1982

[51] Int. Cl.³ .......................... B01J 21/08; B01J 23/26
[52] U.S. Cl. ..................................... 252/452; 252/458
[58] Field of Search ........................ 252/452, 458, 451

[56] References Cited

U.S. PATENT DOCUMENTS

| | | | |
|---|---|---|---|
| 2,342,249 | 2/1944 | Burk | 252/452 |
| 2,865,844 | 12/1958 | Kirshenbaum | 252/458 X |
| 2,895,920 | 7/1959 | Janoski | 252/452 |
| 3,794,713 | 2/1974 | Aboutboul et al. | 252/451 X |
| 3,867,306 | 2/1975 | Witt et al. | 252/452 |
| 3,887,494 | 6/1975 | Dietz | 252/452 |
| 3,950,303 | 4/1976 | Lipscomb | 252/428 X |
| 3,951,863 | 4/1976 | Delap | 252/458 |
| 4,081,407 | 3/1978 | Short et al. | 252/451 |
| 4,119,569 | 10/1978 | Dietz | 252/452 |
| 4,152,503 | 5/1979 | Short et al. | 526/106 |
| 4,186,260 | 1/1980 | Dietz | 526/106 |
| 4,279,780 | 7/1981 | Dombro | 252/452 |

*Primary Examiner*—Carl F. Dees

[57] ABSTRACT

A silica hydrogel containing chromium is aged under conditions such that at least a portion of the aging is carried out at a pH within the range of 7 to 9. The resulting hydrogel is converted to a xerogel by treating with a volatile organic liquid. The desired pH can be obtained either by adding a basic material such as ammonia to the hydrogel prior to or during the aging process or by using a chromium component which inherently gives a higher pH and/or resists the natural tendency for the pH to decrease during aging. An example of such a chromium compound is chloropentammine chromium(III)chloride. The resulting catalyst on activation is particularly suitable for olefin polymerization under conditions where higher melt flow polymer is desired.

25 Claims, 1 Drawing Figure

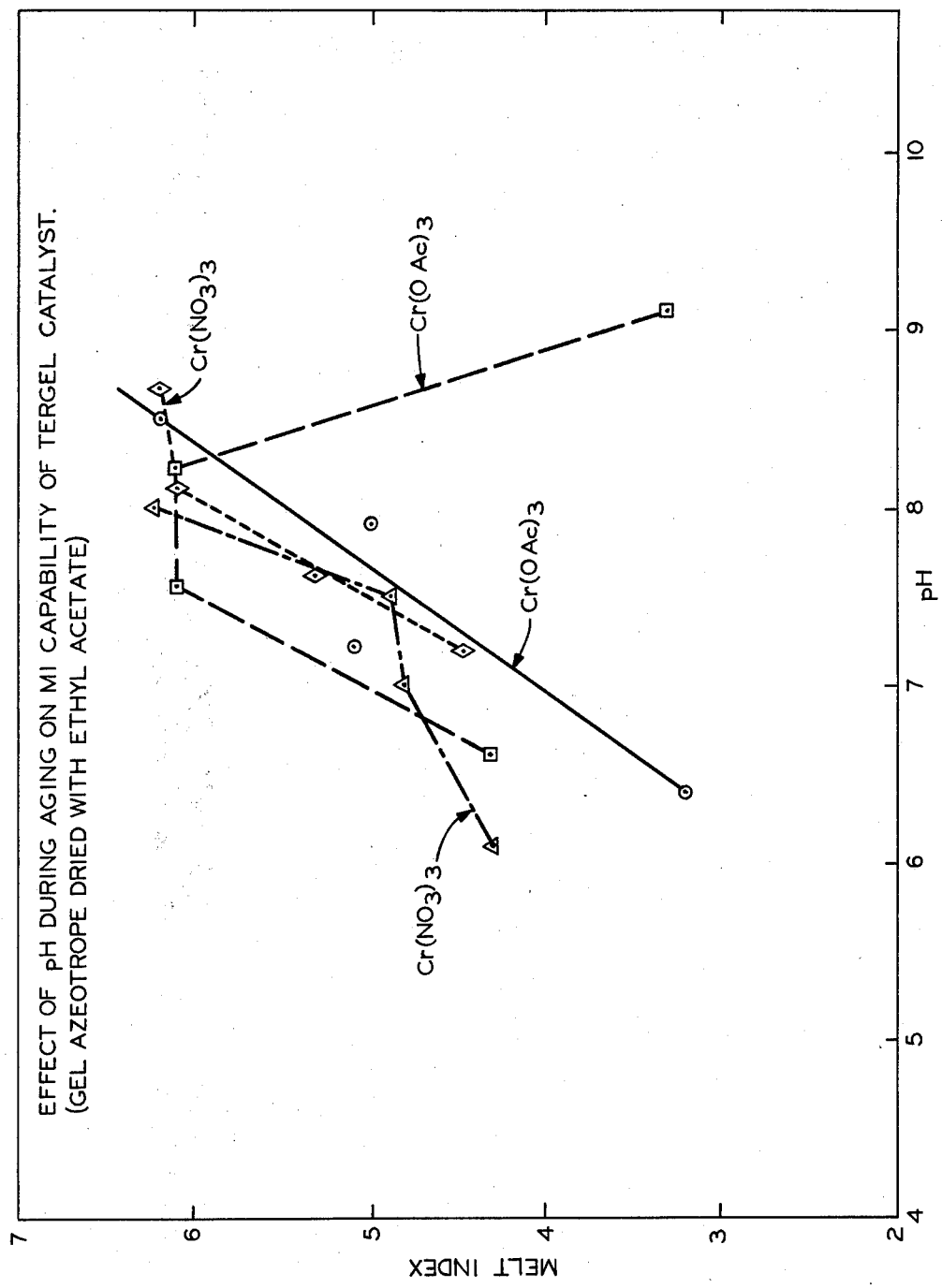

AGING OF CHROMIUM-CONTAINING GEL AT HIGH PH

BACKGROUND OF THE INVENTION

Supported chromium catalysts have long been a dominant factor in the production of high density olefin polymers such as polyethylene. As originally commercialized, these catalysts were used in solution polymerization processes. However, it early became evident that a more economical route to many commercial grades of olefin polymers was a slurry process, that is, a polymerization process carried out at a temperature low enough that the resulting polymer is largely insoluble in the diluent. However, certain control techniques which are easily carried out in solution polymerization systems become more difficult in the slurry system. This is particularly true with regard to control of molecular weight. In a solution system, the temperature can simply be increased in order to provide a lower molecular weight, higher melt flow polymer. However, in slurry systems, there is a practical limit on temperature increases, since the point is quickly reached wherein the polymer goes into solution and thus the value of the slurry system is lost.

In order to allow maximum utilization of the more commercially desirable slurry system, modifications of the catalyst were developed so as to allow the production of higher melt flow polymer. One such modification which has become commercially successful is the formation of a cogel of silica and titania. This cogel is aged and water removed by means of azeotropic distillation or washing with a water miscible organic compound to produce the support for the chromium. Such catalysts have demonstrated a remarkable ability for producing high melt flow polymer. Since chromium must be incorporated at some point in the catalyst preparation, it has been suggested to co-gel the chromium with the silica or if titanium is desired, to form a tergel by gelling silica, titania and chromium together.

Unfortunately, it has been found that co-gellation of the chromium with the silica results in a catalyst which does not produce as high a melt flow polymer as would otherwise be produced.

SUMMARY OF THE INVENTION

It is an object of this invention to take advantage of the simplicity of co-gelling chromium with silica without sacrificing melt index capability of the resulting polymer;

It is a further object of this invention to provide a catalyst capable of giving high melt flow polymer;

It is yet a further object of this invention to provide an improved process for making supported chromium olefin polymerization catalysts;

It is still yet a further object of this invention to provide an improved process for producing a silica-titania-chromium tergel;

It is still yet a further object of this invention to provide an improved catalyst; and It is still yet a further object of this invention to provide an improved olefin polymerization process.

In accordance with this invention a silica hydrogel containing chromium is aged at a pH within the range of 7 to 9 and afterwards water is removed by azeotropic distillation or washing with a volatile water miscible organic liquid.

BREIF DESCRIPTION OF THE DRAWING

The drawing, which forms a part hereof, is a plot of gel pH versus melt index of polymer produced from the resulting catalyst.

DESCRIPTION OF THE PREFERRED EMBODIMENTS

In the description herein, the term "cogel" is arbitrarily used to describe co-gelled silica and titania, and the term "co-gelled silica-chromium" is used to describe a two component silica-chromium hydrogel, i.e. not containing titania. The term "tergel", of course, is used to describe the product resulting from gellation together of silica, titania, and chromium.

Basically, there are two methods of obtaining the aging under conditions of relatively high pH in accordance with this invention. The first is to introduce a basic material such as ammonia into the gel and the second is to utilize a chromium compound which is basic or which at least does not become acid on aging. Of course, the combinations of these two techniques can also be used.

Throughout this application, the reference to silica means a silica-containing material generally composed of 80 to 100 weight percent silica, the remainder, if any, being selected from alumina, boria, magnesia, thoria, zirconia, or mixtures thereof. For instance, the silica-containing material can consist essentially of silica and no more than 0.2 weight percent of alumina or other metal oxide. Other ingredients which do not adversely affect the catalyst or which are present to produce some unrelated result can also be present.

Broadly, the process of producing the hydrogel involves mixing an aqueous solution of an alkali metal silicate with a strong acid such as sulfuric acid generally in the presence of a chromium compound. This mixing can be done under suitable conditions, for instance by means of agitation. The concentration of the $SiO_2$ in the hydrogel which is formed is usually in the range of about 3 to 12 weight percent. A wide range of mixing temperatures can be employed, for instance from about 33° F. to 110° F. (1° to 43° C.).

The invention is primarily directed to the preparation of tergels where the chromium is gelled along with silica and titania. The invention is also applicable to co-gelled silica-chromium systems. If the chromium is not gelled along with the silica, it can be added as an aqueous solution to the hydrogel stage generally employing water soluble chromium compounds such as chromium acetate or chromium trioxide.

Divalent or trivalent water soluble or acid soluble chromium compounds are presently preferred in producing the cogelled silica-chromium hydrogels or silica-titania-chromium tergels. Suitable examples include chromium carboxylates such as chromic acetate and chromous oxalate, chromium halides such as chromic chloride, and chromous chloride, chromous carbonate, chromic hydroxide, chromic nitrate, chromic sulfate and chromous sulfate. The dry product can be conventionally activated at an elevated temperature in an oxygen ambient such as air thus converting at least part of the lower valent chromium to hexavalent chromium.

After gelling, the mixture is aged. This can be carried out at temperatures within the range of about 65° F. to 200° F. (18° to 93° C.). Generally, aging times of one hour or greater are used. For instance, times of one hour to 20 hours, preferably 2 to 10 hours, are suitable.

As is shown from the drawing, the best results are obtained utilizing a pH during the aging process within the range of 7 to 9. This can be obtained by adding a basic material such as ammonia or ammonium hydroxide. This is preferably done by adding the basic material to the hydrogel slurry before aging either alone or in combination with the addition of additional basic material during the aging process since there is a tendency for the pH to decrease during aging. Alternatively, it is possible in some instances to simply add the basic material during aging so as to preclude the pH decrease. Other suitable basic materials include ammonium carbonate, triethylamine, dimethylamine and guanidine.

Alternatively, a chromium compound can be utilized which inherently results in a higher pH and/or which has less of a tendency to produce a pH decrease during aging. Such chromium compounds include coordination chromium compounds having nitrogen-containing groups including double salts and chelates containing $NH_3$ or amines, such as the chromammines.

For example, one class of useful compounds are shown by the formula $CrX_3 \cdot yNH_3$ where X is a halogen ion such as $Cl^-$, $BR^-$, $I^-$ and y is an integer ranging from 1 to 6, e.g. $CrCl_3 \cdot 6NH_3$.

Another class of useful compounds, chromammines, containing 6 neutral groups is shown by the formula $[CrA_6]Z_3$ in which A can be at least one of $NH_3$, ethylenediamine (en) and unsymmetrical propylenediamine (pn) and Z, and acid radical, is a halogen ion as above, $NO_3^-$, $SO_4^{-2}$ and $PO_4^{-3}$. In some instances $H_2O$ can replace a portion of A. Some examples of these include: $[Cr(NH_3)_6](NO_3)_3$, $[Cr(en)_3]Cl_3$, $[Cr(NH_3)_2(H_2O)_4]Br_3$, $[Cr(NH_3)_5H_2O]Cl_3$, $[Cr(pn)_2(H_2O)_2]SO_4$, and the like.

Still another class of useful chromammine compounds containing 5 neutral groups can be shown by the formulae: $[CrA_5Y]Z_2$ where A and Z are as before and Y is a radical from a monobasic acid such as $Cl^-$, $Br^-$, $I^-$, $NO_2^-$, $NO_3^-$, $OH^-$ and $CNS^-$; and $[CrA_5W]V$ where A is as before, V is $Cl^-$, $Br^-$, $I^-$, $(OH)^-$, and W is a radical from a dibasic acid such as $SO_3^{-2}$, $SO_4^{-2}$, $CO_3^{-2}$ and $C_2O_4^{-2}$. Some examples of these include: $[Cr(NH_3)_5Cl]Cl_2$, $[Cr(NH_3)_3(H_2O)_2(OH)]Cl_2$, $[Cr(NH_3)_5SO_4]Cl$, and $[Cr(NH_3)_5CO_3]NO_3$.

Presently preferred compounds include chloropentammine chromium(III) chloride and hexamminechromium(III) nitrate because of reasonable availability.

A more extensive review of the coordination compounds is presented in Inorganic Chemistry by P. C. L. Thorne and E. R. Roberts, 5th Ed, Revised, Interscience Publishers, Inc. 1948, pages 320-322, the disclosure of which is hereby incorporated by reference. With such chromium compounds, no base is needed in most cases although a base can be used, too, if desired.

Following the aging, the gel may be agitated to produce a slurry which is washed several times with water and with either an ammonium salt or dilute acid to reduce the alkali metal content of the gel to less than about 0.1 weight percent. While various ammonium salts and dilute acid solutions can be employed, the preferred salts are those such as ammonium nitrate and ammonium salts of organic acids which decompose and volatilize on subsequent calcination.

Water is removed from the hydrogel in any suitable manner and preferably by washing with a normally liquid volatile organic compound which is miscible with water or by azeotropic distillation employing such an organic compound. This procedure converts the hydrogel to a xerogel.

Suitable oxygen-containing organic compounds for removing water include methyl isobutylketone, ethyl acetate, sec-butyl alcohol, n-propyl alcohol, butyraldehyde, diisobutyl ether, isopropyl acetate, and other similar volatile organic compounds. The presently preferred are alcohols, more preferably 5 and 6 carbon atom alcohols, such as 3-methyl-1-butanol, 1-pentanol, 2-pentanol and 1-hexanol, most preferably 3-methyl-1-butanol, 1-pentanol or 1-hexanol.

The chromium compound is incorporated in an amount sufficient to give 0.001 to 10, preferably 0.1 to 5, most preferably about 1 weight percent chromium based on the weight of the dried silica base (xerogel).

When titanium is co-gelled with the silica, the titanium compound is preferably incorporated with the acid. The titanium compound can be incorporated in the acid in any form in which it will be subsequently incorporated in the silica gel formed on combination of the silicate and the acid (preferably by means of adding the silicate to the acid) and from which form it is subsequently convertable to the titanium oxide. Suitable titanium compounds include the halides such as $TiCl_3$ and $TiCl_4$, the nitrates, the sulfates, the oxalates, alkyl titanates, for instance. The titanium compound is incorporated in an amount such that the weight percent of titanium present based on the weight of the final calcined catalyst is in the range of 0.1 to 10, preferably 0.5 to 5 weight percent. The chromium-containing xerogel can be activated for polymerization by calcination in a dry oxygen-containing ambient such as air at a temperature ranging from about 800° F. to about 2000° F. (425° to 1095° C.) for a time ranging from about 1 to 50 hours, preferably 2 to 20 hours. Other known activation procedures such as reduction and oxidation can be used as disclosed in McDaniel et al, U.S. Pat. No. 4,182,815 (Jan. 8, 1980), the disclosure of which is hereby incorporated by reference.

The catalyst of this invention can be used to polymerize at least one mono-1-olefin containing 2 to 8 carbon atoms per molecule, preferably ethylene, propylene, 1-butene, 1-pentene, 1-hexene, 4-methyl-1-pentene, and 1-octene. The invention is of particular applicability in producing ethylene homopolymers and copolymers from mixtures of ethylene and 0.5 to 20 mole percent of one or more comonomers selected from 1-olefins containing 3 to 8 carbon atoms per molecule. Exemplary comonomers include aliphatic 1-olefins, such as propylene, 1-butene, 1-pentene, 1-hexene, 4-methyl-1-pentene, 1-octene and other higher olefins and conjugated or non-conjugated diolefins such as 1,3-butadiene, isoprene, piperylene, 2,3-dimethyl-1,3-butadiene, 1,4-pentadiene, 1,5-hexadiene, and other such diolefins and mixtures thereof. Ethylene copolymers preferably constitute at least about 90, preferably 97 to 99.8 mole percent polymerized ethylene units. With ethylene/hexene copolymers, about 98 to 99.8 mole percent ethylene is preferred, the remainder of course being the comonomer. Propylene, 1-butene, 1-pentene, 1-hexene and 1-octene are especially preferred comonomers for use with ethylene.

The polymers can be prepared from the catalyst of this invention by solution polymerization, slurry polymerization, or other polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in U.S. Pat. No. 3,624,603 which issued Nov. 30, 1971 to Witt, the disclosure of which is hereby incorporated by reference.

The catalyst of this invention is particularly suitable for use in slurry polymerizations. The slurry process is generally carried out in an inert diluent (medium) such as paraffin, cycloparaffin or aromatic hydrocarbon. For predominantly ethylene polymers, a temperature of about 66° to 110° C. is employed. Pressures in the particle form process can vary from about 110 to about 700 psia (0.76–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

Hydrogen can be used to control molecular weight as is known in the prior art. When used, it is generally used at concentrations up to 2 mole percent of reaction mixture, preferably within the range of 0.1 to 1 mole percent of reaction mixture.

EXAMPLE I

Catalyst Preparation

A series of tergel catalysts was prepared by mixing an aqueous sulfuric acid solution containing titanyl sulfate and the specified chromium compound with an aqueous sodium silicate solution at a reaction temperature of about 20° to 30° C. to obtain a gel at a pH of about 6 to 7. The sodium silicate solution was added to the acid solution with stirring over about a 7 to 10 minute period of time with the quantity of reagents employed. Each gel was divided into approximately equal portions with each portion diluted with deionized water and placed into a plastic bag along with the desired quantity of dilute ammonium hydroxide solution, if used, to effect the desired increase in pH. Each bag was placed in a water bath maintained at about 80° to 82° C. where aging was conducted for about 4 hours. After aging, each hydrogel was filtered, washed with deionized water and then with a dilute aqueous solution of ammonium nitrate until the sodium ion concentration in the hydrogel was reduced to about 0.1 weight percent based on the dry weight of the catalyst. Water was removed from the washed hydrogels by azeotropic distillation employing ethyl acetate. The resulting dried composites were blue-green in color, indicating the presence of trivalent chromium. Each composite was activated for polymerization by calcination with dry air in a fluidized bed for 5 hours at 1600° F. (871° C.). The catalyst was recovered and stored in dry air until ready for use. Each finished catalyst contained about 1 weight percent chromium as chromium oxide and about 2.5 weight percent titanium as titanium dioxide with the balance consisting of silica.

For example, to 70.1 g of an aqueous acid solution containing a ratio of 11 g of a commercial $TiOSO_4$ product having 12.3 weight percent titanium to 25 g concentrated sulfuric acid was added 200 cc deionized water and 200 cc deionized water containing 8.3 cc of aqueous chromic acetate (equivalent to 1.20 g chromium). The mixture was cooled to 66° F. (19° C.) and to it over a 10 minute period with stirring was added 995 g of an aqueous sodium silicate solution containing about 12 weight percent $SiO_2$ to a pH of 6.4 with the temperature of the final mixture recorded as about 84° F. (29° C.). The hydrogel was divided into 4 approximately equal portions, each portion was mixed with 150 cc of deionized water, placed into a plastic bag and the bag was positioned in a water bath maintained at 178° to 180° F. (81° to 82° C.) where the sample was aged for 4 hours at that temperature. The control sample received no other additive. The second sample was admixed with 2.5 cc of aqueous ammonium hydroxide (25 volume percent $NH_3$), the third was admixed with 8 cc of the ammonium hydroxide and the fourth was admixed with 16 cc of the ammonium hydroxide. After aging, each sample was filtered, washed, dried and activated as described before as conventionally known in the art.

EXAMPLE II

Ethylene Polymerization

Each catalyst (Example I) was tested for ethylene polymerization in a 2 liter stirred, stainless steel reactor containing about 1.25 lbs (567 g) of isobutane as diluent. Polymerization was conducted at 230° F. (110° C.) and at 550 psig (3.8 MPa) total pressure until approximately 5,000 g polymer per g catalyst resulted. Polymerization time was typically 40–50 minutes. Each recovered polymer was dried, stabilized with 0.15 weight percent of a conventional stabilizing system, and the melt index determined according to ASTM D 1238-65T, Condition E. The nature of the chromium compound, the pH used in the catalyst preparations and the results obtained are given in Tables I, II, III and IV.

TABLE I

Ethylene Polymerization Catalysts Derived From Chromic Acetate

| Run No. | pH Of Hydrogel Slurry | | | | Catalyst Weight g | Polymer Yield g | Productivity[c] g/g | Adjusted[d] MI at 5,000 g/g |
|---|---|---|---|---|---|---|---|---|
| | No NH$_4$OH | | With NH$_4$OH | | | | | |
| | BA[a] | AA[b] | BA | AA | | | | |
| 1 | 6.4 | 5.4 | — | — | 0.0463 | 243 | 5250 | 3.2 |
| 2 | — | — | 7.2 | 6.4 | 0.0321 | 161 | 5020 | 5.1 |
| 3 | — | — | 7.9 | 7.45 | 0.0306 | 153 | 5000 | 5.0 |
| 4 | — | — | 8.5 | 8.25 | 0.0352 | 165 | 4690 | 6.2 |
| 5 | 6.6 | 5.5 | — | — | 0.0337 | 174 | 5160 | 4.3 |
| 6 | — | — | 7.55 | 6.95 | 0.0343 | 171 | 4960 | 6.1 |
| 7 | — | — | 8.2 | 8.4 | 0.0367 | 178 | 4850 | 6.1 |

TABLE I-continued

Ethylene Polymerization Catalysts Derived From Chromic Acetate

| Run No. | pH Of Hydrogel Slurry | | | | Catalyst Weight g | Polymer Yield g | Productivity[c] g/g | Adjusted[d] MI at 5,000 g/g |
|---|---|---|---|---|---|---|---|---|
| | No NH$_4$OH | | With NH$_4$OH | | | | | |
| | BA[a] | AA[b] | BA | AA | | | | |
| 8 | — | — | 9.0 | 9.2 | 0.0405 | 208 | 5140 | 3.5 |

[a]BA means before aging.
[b]AA means after aging.
[c]Productivity in terms of g polymer per g catalyst.
[d]Calculated from actual melt index and corrected to 5,000 g polymer per g catalyst as known in the art. See U.S. Pat. No. 4,151,122, column 7, line 66 to line 2, column 8.

TABLE II

Ethylene Polymerization Catalysts Derived From Chromic Nitrate

| Run No. | pH Of Hydrogel Slurry | | | | Catalyst Weight g | Polymer Yield g | Productivity g/g | Adjusted MI at 5,000 g/g |
|---|---|---|---|---|---|---|---|---|
| | No NH$_4$OH | | With NH$_4$OH | | | | | |
| | BA | AA | BA | AA | | | | |
| 9  | 7.2  | 7.9 | —    | —   | 0.0342 | 182 | 5320 | 4.6 |
| 10 | —    | —   | 7.6  | 8.3 | 0.0346 | 173 | 5000 | 5.3 |
| 11 | —    | —   | 8.1  | 8.8 | 0.0364 | 184 | 5050 | 6.0 |
| 12 | —    | —   | 8.65 | 9.3 | 0.0347 | 187 | 5390 | 6.1 |
| 13 | 6.1  | 6.1 | —    | —   | 0.0364 | 183 | 5030 | 4.6 |
| 14 | —    | —   | 7.0  | 7.2 | 0.0331 | 155 | 4680 | 4.8 |
| 15 | —    | —   | 7.5  | 8.0 | 0.0385 | 200 | 5190 | 4.9 |
| 16 | —    | —   | 8.0  | 8.7 | 0.0374 | 186 | 4970 | 6.2 |

TABLE III

Ethylene Polymerization Catalysts Derived From Chromic Chloride and Chromic Sulfate

| Run No. | Chromium Source | pH Of Hydrogel Slurry | | | | Catalyst Weight g | Polymer Yield g | Productivity g/g | Adjusted MI at 5,000 g/g |
|---|---|---|---|---|---|---|---|---|---|
| | | No NH$_4$OH | | With NH$_4$OH | | | | | |
| | | BA | AA | BA | AA | | | | |
| 17 | CrCl$_3$       | 5.9  | 5.5 | —   | —   | 0.0344 | 176 | 5120 | 5.3 |
| 18 | CrCl$_3$       | —    | —   | 8.1 | 8.1 | 0.0375 | 197 | 5250 | 3.1 |
| 19 | Cr$_2$(SO$_4$)$_3$ | 6.4  | 6.6 | —   | —   | 0.0391 | 205 | 5240 | 4.9 |
| 20 | Cr$_2$(SO$_4$)$_3$ | —    | —   | 8.0 | 8.7 | 0.0352 | 182 | 5170 | 6.1 |
| 21 | Cr$_2$(SO$_4$)$_3$ | 6.25 | 6.6 | —   | —   | 0.0460 | 234 | 5090 | 5.2 |
| 22 | Cr$_2$(SO$_4$)$_3$ | —    | —   | 8.2 | 8.9 | 0.0384 | 183 | 4770 | 6.3 |

TABLE IV

Ethylene Polymerization Miscellaneous Catalysts

| Run No. | Chromium Source | pH Of Hydrogel Slurry | | | | Catalyst Weight g | Polymer Yield g | Prod. g/g | Adjusted MI at 5,000 g/g |
|---|---|---|---|---|---|---|---|---|---|
| | | No NH$_4$OH | | With NH$_4$OH | | | | | |
| | | BA | AA | BA | AA | | | | |
| 23 | Cr$_2$(PO$_4$)$_3$ | 6.1 | 6.4 | — | — | 0.0386 | 190 | 4920 | 3.1 |
| 24 | Cr$_2$(PO$_4$)$_3$ | — | — | 8.3 | 8.6 | 0.0470 | 225 | 4790 | 4.3 |
| 25 | Cr$_2$(SO$_4$)$_3$·K$_2$SO$_4$ | 5.4 | 4.5 | — | — | 0.0356 | 188 | 5280 | 2.8 |
| 26 | Cr$_2$(SO$_4$)$_3$·K$_2$SO$_4$ | — | — | 7.1 | 7.5 | 0.0370 | 198 | 5350 | 5.7 |
| 27[e] | CrO$_3$ | 6.6 | 7.4 | — | — | 0.0357 | 177 | 4960 | 5.8 |
| 28[e] | CrO$_3$ | — | — | 7.4 | 8.0 | 0.0320 | 161 | 5030 | 5.6 |
| 29[e] | CrO$_3$ | — | — | 7.8 | 8.6 | 0.0420 | 222 | 5290 | 5.7 |
| 30[e] | CrO$_3$ | — | — | 8.2 | 9.0 | 0.0381 | 208 | 5460 | 4.6 |

[e]Silica-titania cogel preparation, CrO$_3$ added to washed hydrogel just prior to azeotrope drying with ethyl acetate comparative runs.

Inspection of the results presented in the tables reveals that active catalysts were made with each chromium compound tested. The melt index results of Runs 1–26 show that it is necessary to maintain the pH of the tergel hydrogels above about 7 to optimize the melt index capability of the catalysts. In Run 8, where the pH was about 9 or higher, it is noted that polymer made with the catalyst exhibited a melt index decrease relative to others in this series (Runs 5, 6, 7). These data, taken in conjunction with the other results, suggest that the hydrogel pH should range from about 7 to near 9, to maximize the melt index capability of the tergel catalysts.

Runs 27–30 show that in runs outside the scope of this invention, i.e. where the chromium is added after aging, the higher pH is of no value. As can be seen, the melt index is not improved any by the higher pH (because it is already good).

Based on the melt index results in the various tables, the best tergel catalysts were derived from the acetate, nitrate and sulfates of chromium. The nitrate and sulfates are more preferred since no leaching of the chromium is noted when the hydrogel is contacted with water. Some leaching did occur with the acetate although most is readsorbed into the hydrogel during the aging step.

EXAMPLE III

Catalyst Preparation Employing Chromium Coordination Compounds AS Cr Source

This Example demonstrates the use of a chromium salt containing NH3 or amine groups, e.g. chromammines, which inherently gives a gel which has a higher pH and/or resists pH decrease during aging.

A series of tergel catalysts were prepared by mixing an aqueous sulfuric acid solution containing titanyl sulfate with an aqueous solution containing the specified chromium coordination compound. The mixture was reacted with an aqueous sodium silicate solution while stirring at about 20° to 30° C. to obtain a gel at about a 6 to 7 pH. The reaction time ranged from about 7 to 10 minutes with the quantity of reagents employed. Each gel was divided into approximately equal portions, diluted with approximately 125 cc of deionized water and placed in a plastic bag along with the desired quantity of ammonium hydroxide solution, if used, to effect the desired increase in pH. Each bag was placed in a water bath maintained at about 80° to 90° C. where aging was continued for about 4 hours. After aging, each tergel was filtered, washed with deionized water, then washed with dilute aqueous ammonium nitrate solution, dried by azeotropic distillation and activated for ethylene polymerization by calcination in dry air as described before in Example I. Each finished catalyst contained about 1 weight percent chromium as chromium oxide and about 2.5 weight percent titanium as titanium dioxide with the balance consisting of silica.

For example, to 82 g of an aqueous solution containing 25 g of concentrated sulfuric acid and 11 g of TiOSO4 (12.3 weight percent Ti) was added 150 cc of deionized water containing 3.18 g of dissolved hexamminechromium(III) nitrate. To the stirred mixture at about 20° C. over a 9 minute period was added 416.4 g of aqueous sodium silicate solution (11.9 weight percent SiO2) to a pH of 6.7 to obtain an orange-brown hydrogel. The hydrogel was diluted with 250 cc of deionized water and the slurry was divided into two approximately equal portions. Each sample was placed in a plastic bag and each bag was put in a water bath maintained at about 85° C. to 90° C. for aging at 4 hours. The first sample received no additive. The second sample was mixed with 6 cc of ammonium hydroxide (25 volume percent NH3) prior to being aged. The aged hydrogel slurries derived from hexamminechromium(III) nitrate, [Cr(NH3)6](NO3)3; and chloropentamminechromium(III) chloride, [Cr(NH3)5Cl]Cl2 were green in color whereas the aged hydrogel slurries derived from tris(ethylenediamine-chromium(III) chloride were purple in color. After aging, each hydrogel was filtered, washed, dried and activated as previously described.

EXAMPLE IV

Ethylene Polymerization

A sample of each activated catalyst was tested for ethylene polymerization in the manner described in Example II. The nature of the chromium compounds used, the pH of the hydrogel slurries and the results obtained are given in Table V.

TABLE V

Ethylene Polymerization With Catalysts Derived From Chromammines

| Run No. | Chromammine | pH of Hydrogel Slurry No NH4OH BA | pH of Hydrogel Slurry No NH4OH AA | pH of Hydrogel Slurry With NH4OH BA | pH of Hydrogel Slurry With NH4OH AA | Catalyst Weight g | Polymer Yield g | Prod. g/g | Adjusted MI at 4000 g/g |
|---|---|---|---|---|---|---|---|---|---|
| 31 | [Cr(NH3)6](NO3)3 | 6.7 | 8.3 | — | — | 0.0413 | 165 | 4000 | 6.8 |
| 32 | [Cr(NH3)6](NO3)3 | — | — | 8.6 | 9.3 | 0.0316 | 121 | 3830 | 5.8 |
| 33 | [Cr(NH3)5Cl]Cl2 | 6.4 | 8.1 | — | — | 0.0393 | 175 | 4450 | 8.7 |
| 34 | [Cr(NH3)5Cl]Cl2 | — | — | 8.1 | 8.8 | 0.0494 | 224 | 4530 | 6.4 |
| 35(a) | [Cr(en)3]Cl3 | 6.7 | 7.4 | — | — | 0.0310 | 134 | 4320 | 7.5 |
| 36 | [Cr(en)3]Cl3 | — | — | 8.05 | 8.4 | 0.0334 | 134 | 4010 | 8.4 |

(a)en stands for ethylenediamine

Inspection of the results given in Table V indicates that active catalysts were made from each chromammine compound. The addition of ammonia to increase the hydrogel pH is not always needed and may actually result in lowering the melt index capability of the tergel catalysts (Runs 31, 32, 33 and 34). It is believed that the relatively low polymer melt index of 5.8 in Run 32 might be due to the rather high pH 9.3 observed in preparation of the catalyst.

On the other hand with the catalysts prepared from the chrommamine derived from ethylene diamine, it is apparent that the use of a little ammonia to increase the pH of the hydrogel slurry is beneficial in increasing the melt index capability of the catalyst. Thus, catalysts derived from some chromammines, e.g. hexamminechromium(III) nitrate may show a moderate lowering in melt index capability when ammonia is used in the catalyst preparation to increase the pH. Other catalysts derived from some chromammines such as tris(ethylenediamine)chromium(III) chloride may show a moderate increase in melt index capability when ammonia is used in the catalyst preparation to increase the pH. The nature of the ligand used in forming the chromammine therefore appears to influence the melt index capability of the catalyst to some extent.

While this invention has been described in detail for the purpose of illustration, it is not to be construed as limited thereby but is intended to cover all changes and modifications within the spirit and scope thereof.

I claim:

1. A process comprising:
    forming a co-gelled silica-chromium hydrogel;
    aging said hydrogel for a time of at least one hour;
    maintaining a pH of said hydrogel during at least a major portion of said aging at a value within the range of 7 to 9; and
    treating said hydrogel with a volatile liquid organic compound to remove water and thus convert said hydrogel to a xerogel, said chromium being present in an amount to give 0.001 to 10 weight percent chromium based on the weight of said xerogel.

2. A method according to claim 1 wherein said pH is maintained within the range of 7 to 9 by means of adding a basic material to said hydrogel.

3. A method according to claim 2 wherein said basic material is one of ammonia or ammonium hydroxide.

4. A method according to claim 2 wherein said basic material is added prior to said aging.

5. A method according to claim 2 wherein said volatile liquid organic compound is an alcohol.

6. A method according to claim 5 wherein said alcohol is one of 1-pentanol, 3-methyl-1-butanol, or 1-hexanol.

7. A method according to claim 1 wherein said volatile liquid organic compound is an alcohol.

8. A method according to claim 7 wherein said alcohol is one of 1-pentanol, 3-methyl-1-butanol, or 1-hexanol.

9. A method according to claim 1 wherein said pH is maintained at said value of 7 to 9 by means of utilizing a coordination chromium compound having a nitrogen-containing group.

10. A method according to claim 9 wherein said chromium compound is chloropentamine chromium(III) chloride.

11. A method according to claim 1 wherein said hydrogel is formed by adding a solution of sodium silicate into acid containing a chromium compound.

12. A method according to claim 11 wherein said aging is carried out at a temperature within the range of 65° F. (18° C.) to 200° F. (93° C.) for a time within the range of one hour to 20 hours.

13. A method according to claim 1 comprising in addition heating said xerogel in an oxygen containing ambient at a temperature within the range of 800° F. (425° C.) to 2000° F. (1095° C.) to activate same.

14. A catalyst produced by the method of claim 1.

15. A process comprising:
forming a silica, titania, chromium tergel hydrogel, said chromium coming from a coordination chromium compound having a nitrogen-containing group;
aging said hydrogel for at least one hour; and
treating said hydrogel with a volatile liquid organic compound to remove water and thus convert said hydrogel to a xerogel.

16. A method according to claim 15 wherein said volatile organic liquid is an alcohol.

17. A method according to claim 15 wherein said alcohol is one of 1-pentanol, 3-methyl-1-butanol, or 1-hexanol.

18. A method according to claim 15 wherein said chromium compound is selected from hexamminechromium(III) nitrate and chloropentamine chromium(III) chloride.

19. A method according to claim 15 wherein said hydrogel is formed by adding a solution of sodium silicate into acid containing a titanium compound and said chromium compound.

20. A method according to claim 19 wherein said aging is carried out at a temperature within the range of 65° F. (18° C.) to 200° F. (93° C.) for a time within the range of one hour to 20 hours.

21. A catalyst produced by the method of claim 15.

22. A method according to claim 1 wherein said chromium is present in an amount within the range of 0.1 to 5 weight percent based on the weight of said xerogel.

23. A method according to claim 15 wherein said chromium is present in an amount within the range of 0.001 to 10 weight percent based on the weight of said xerogel.

24. A method according to claim 15 wherein said chromium is present in an amount within the range of 0.1 to 5 weight percent based on the weight of said xerogel.

25. A method according to claim 15 wherein said chromium compound is selected from
(a) compounds of the formula $CrX_3 \cdot yNH_3$ where X is a halogen ion selected from $Cl^-$, $Br^-$, $I^{31}$ and y is an integer ranging from 1 to 6;
(b) chromammines containing 6 neutral groups of the formula $[CrA_6]Z_3$ in which A is selected from $NH_3$, ethylenediamine and unsymmetrical propylenediamine provided further that a portion of A can be $H_2O$ and Z is an acid radical selected from $Cl^-$, $Br^-$, $I^-$, $NO_3^-$, $SO_4^{-2}$ and $PO_4^{-3}$;
(c) chromammine compounds containing 5 neutral groups of the formula: $[CrA_5Y]Z_2$ where A and Z are as before and Y is a radical from a monobasic acid selected from $Cl^-$, $Br^-$, $I^-$, $NO_2^-$, $NO_3^-$, $OH^-$ and $CNS^-$; and
(d) chromammine compounds containing 5 neutral groups of the formula $[CrA_5W]V$ where A is as before, V is $Cl^-$, $Br^-$, $I^-$, $(OH)^-$, and W is a radical from a dibasic acid selected from $SO_3^{-2}$, $SO_4^{-2}$, $CO_3^{-2}$ and $C_2O_4^{-2}$.

* * * * *